US012469387B2

(12) United States Patent
Ma et al.

(10) Patent No.: US 12,469,387 B2
(45) Date of Patent: Nov. 11, 2025

(54) TRAFFIC LIGHT TIMING CONTROL METHOD AND SYSTEM

(71) Applicant: Hubei University, Wuhan (CN)

(72) Inventors: Chuanxiang Ma, Wuhan (CN); Wei Chen, Wuhan (CN); Yan Zhang, Wuhan (CN); Jiaqi Wan, Wuhan (CN); Shiyi Gan, Wuhan (CN)

(73) Assignee: Hubei University, Wuhan (CN)

( * ) Notice: Subject to any disclaimer, the term of this patent is extended or adjusted under 35 U.S.C. 154(b) by 47 days.

(21) Appl. No.: 18/660,244

(22) Filed: May 10, 2024

(65) Prior Publication Data

US 2024/0378996 A1 Nov. 14, 2024

(30) Foreign Application Priority Data

May 10, 2023 (CN) ........................ 202310046437.8

(51) Int. Cl.
*G08G 1/08* (2006.01)
*G08G 1/01* (2006.01)

(52) U.S. Cl.
CPC ............. *G08G 1/08* (2013.01); *G08G 1/0129* (2013.01)

(58) Field of Classification Search
CPC ............................... G08G 1/08; G08G 1/0129
USPC .......................................................... 340/917
See application file for complete search history.

(56) References Cited

U.S. PATENT DOCUMENTS

| | | | | |
|---|---|---|---|---|
| 3,825,890 | A * | 7/1974 | Miyazato | G08G 1/082 340/913 |
| 9,672,735 | B2 * | 6/2017 | Fowe | G08G 1/0112 |
| 2015/0120174 | A1 * | 4/2015 | Lewis | G08G 1/0129 701/118 |
| 2016/0148507 | A1 * | 5/2016 | Pittman | G06Q 30/0255 340/917 |
| 2017/0069204 | A1 * | 3/2017 | Hofman | G08G 1/02 |

(Continued)

FOREIGN PATENT DOCUMENTS

| | | | |
|---|---|---|---|
| CN | 109493617 | A | 3/2019 |
| CN | 110111592 | B | 8/2019 |

(Continued)

OTHER PUBLICATIONS

Office Action of CN 202310046437.8 Dated Jul. 27, 2023.

(Continued)

*Primary Examiner* — Brian A Zimmerman
*Assistant Examiner* — Thang D Tran
(74) *Attorney, Agent, or Firm* — Westbridge IP LLC

(57) ABSTRACT

The present invention discloses a traffic light timing control method and system, including the following steps: S1: completing monitoring of traffic flow, and recording and storing traffic flow data in each data collection gap; S2: dividing a historical dataset into a sample PA and a sample PB, and assigning a crowding level; S3: obtaining duration of a green light of each piece of traffic flow data separately; S4: generating a preliminary classification model according to the duration of the green light. In the present invention, the duration of a green light at different periods and under different crowd conditions can be dynamically adjusted and the duration of a data collection gap is also adjusted for an actual road condition, so that a green light timing control solution obtained finally can better meet an actual traffic control requirement.

9 Claims, 3 Drawing Sheets

(56) References Cited

U.S. PATENT DOCUMENTS

| | | | | |
|---|---|---|---|---|
| 2018/0096595 | A1* | 4/2018 | Janzen | G06V 10/94 |
| 2020/0160701 | A1* | 5/2020 | Mobasser | G08G 1/0145 |
| 2020/0334979 | A1* | 10/2020 | Gonçalves | G08G 1/0129 |
| 2021/0065545 | A1* | 3/2021 | Lange | G08G 1/091 |
| 2021/0174714 | A1* | 6/2021 | DeLorean | G08G 1/052 |
| 2021/0375129 | A1* | 12/2021 | Meng | G06N 3/045 |
| 2021/0398434 | A1* | 12/2021 | Madden | G08G 5/56 |
| 2022/0105926 | A1* | 4/2022 | Zhang | G08G 1/162 |
| 2022/0222556 | A1* | 7/2022 | Zhang | G06N 7/02 |
| 2024/0363006 | A1* | 10/2024 | Liu | G08G 1/08 |

FOREIGN PATENT DOCUMENTS

| | | | |
|---|---|---|---|
| CN | 110276370 | A | 9/2019 |
| CN | 110414833 | B | 11/2019 |
| CN | 110491144 | B | 11/2019 |
| CN | 110610615 | B | 12/2019 |
| CN | 111429730 | A | 7/2020 |
| CN | 111932913 | B | 11/2020 |
| CN | 111985619 | B | 11/2020 |
| CN | 112712714 | A | 4/2021 |
| CN | 113160585 | B | 7/2021 |
| CN | 113838296 | B | 12/2021 |
| CN | 113947927 | B | 1/2022 |
| CN | 115565389 | A | 1/2023 |
| CN | 115662159 | B | 1/2023 |

OTHER PUBLICATIONS

Zeng weibo, etc., traffic lighttiming optimization and simulation research, Geomatics and Information Science of Wuhan University, vol. 47, No. 4, Apr. 30, 2021 (Apr. 30, 2021), pp. 597-603.

Zhang Caili, etc., A Research on Road Type Classification Considering the Multi-mode Features of Road Network and Trajectories, Journal of Geo-information Science, vol. 24, No. 10, Sep. 30, 2022 (Sep. 30, 2022), pp. 1925-1940.

* cited by examiner

TRAFFIC LIGHT TIMING CONTROL METHOD AND SYSTEM

The application claims priority to Chinese patent application No. CN2023100464378, filed on May 10, 2023, the entire contents of which are incorporated herein by reference.

TECHNICAL FIELD

The present invention relates to the technical field of public transportation, and in particular, to a traffic light timing control method and system.

TECHNICAL BACKGROUND

The duration of traffic lights in daily life is adjusted as per fixed duration, and as a result, citizens have to wait for a long time due to excessively long duration of red lights when traveling during low-traffic hours, and when traveling during rush hours, citizens experience a waste of time due to short duration of green lights, and even traffic congestion and traffic accidents are caused.

SUMMARY

In view of the disadvantages of the prior art, an objective of the present invention is to provide a traffic light timing control method and system, which can dynamically adjust the duration of a green light at different periods and under different crowd conditions and also adjust the duration of a data collection gap for an actual road condition, so that a green light timing control solution obtained finally can better meet an actual traffic control requirement.

On the one hand, this application provides a traffic light timing control method, including the following steps:

S1: completing monitoring of traffic flow in a specific road section, and recording and storing traffic flow data in each of N data collection gaps, to obtain a historical dataset including N traffic flow data samples, where traffic flow data in each data collection gap includes: recording start time, traffic flow in this gap and crowd or non-crowd;

S2: dividing the historical dataset into a sample PA including M pieces of crowd data and a sample PB including (N−M) pieces of non-crowd data according to the crowd or non-crowd, and assigning a crowding level to each piece of traffic flow data in the sample PA and the sample PB;

S3: obtaining the duration of a green light of each piece of traffic flow data in the sample PA and the sample PB separately;

S4: generating a preliminary classification model Ai according to the duration of the green light;

S5: obtaining traffic flow data at the current moment, predicting the duration of a green light for traffic flow according to the preliminary classification model $A_i$ or an optimized classification model $A_{i+1}$ of the preliminary classification model $A_i$, and predicting the duration of a red light in traffic lights to which the green light belongs according to the predicted duration of the green light;

and S6: controlling timing of the green light and the red light on the same traffic lights according to the predicted duration of the green light and the red light.

On the other hand, a traffic light timing control system is further provided, including a data storage unit, configured to record and store traffic flow data of a specific road section in each of N data collection gaps;

an assignment unit, configured to assign a crowding level to each piece of traffic flow data in a sample PA including M pieces of crowd data and a sample PB including (N−M) pieces of non-crowd data;

a timing unit, configured to obtain the duration of a green light of each piece of traffic flow data in the sample PA and the sample PB separately;

a model generating unit, configured to generate a preliminary classification model $A_i$ according to the duration of the green light;

a model optimization unit, configured to optimize the preliminary classification model $A_i$, to obtain the optimized classification model $A_{i+1}$;

a timing prediction unit, configured to predict the duration of a green light for traffic flow according to traffic flow data at the current moment and the preliminary classification model $A_i$ or an optimized classification model $A_{i+1}$ of the preliminary classification model $A_i$;

and a timing control unit, configured to control the timing of the green light in the traffic lights according to the predicted duration of the green light.

This application has at least the following technical effects or advantages:

In the present invention, the duration of a green light can be dynamically adjusted at different periods and under different crowding conditions with reference to historical crowding conditions, and on this basis, a prediction model is obtained to ensure that a timing result of the green light better matches an actual condition; the duration of a data collection gap is also adjusted for an actual road condition, and a duration adjustment pace of the green light is further optimized, so that a green light timing control solution obtained finally can better meet the actual traffic control requirement.

BRIEF DESCRIPTION OF THE DRAWINGS

To illustrate the technical solution in embodiments in the present invention more clearly, the following briefly introduces the accompanying drawings required for the description of the embodiments. Obviously, the accompanying drawings in the following description are some embodiments of the present invention. Ordinary technicians in the field may still derive other drawings from these accompanying drawings without creative efforts.

DETAILED DESCRIPTION OF EMBODIMENTS

A principle and characteristic of the present invention are described below with reference to the accompanying drawings, and the described embodiments are only used to explain the present invention other than to limit the scope of the present invention.

Embodiment 1

Figure 1:
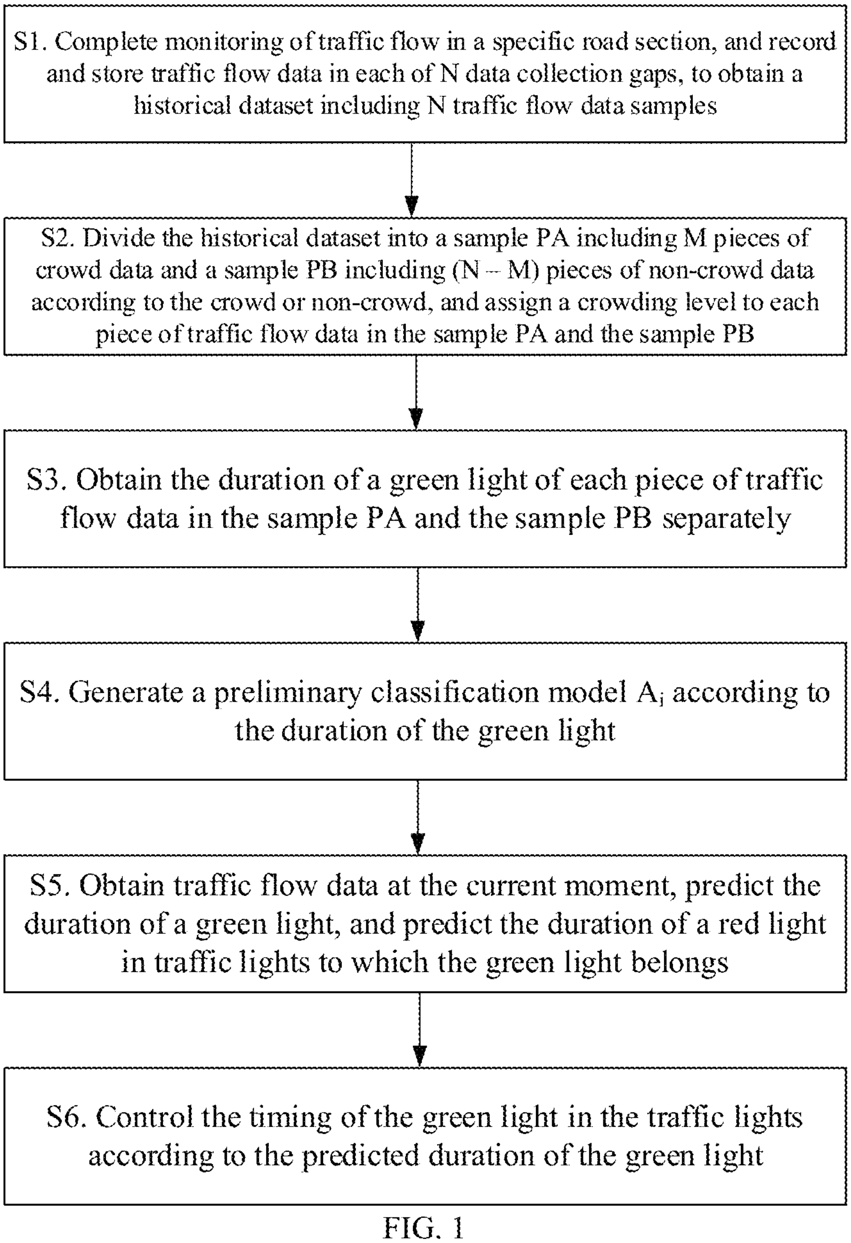
FIG. 1 is a schematic flowchart of steps of a traffic light timing control method according to an embodiment of the present invention.

As shown in FIG. 1, this embodiment provides a traffic light timing control method, including the following steps:

S1. Complete monitoring of traffic flow in a specific road section, and record and store traffic flow data in each of N data collection gaps (Gap) by using a device such as a camera, to obtain a historical dataset P including N traffic flow data samples {($Time_1$, $Flow_1$, $Crowd_1$), ($Time_2$, $Flow_2$, $Crowd_2$), . . . , ($Time_N$, $Flow_N$, $Crowd_N$)}.

In this embodiment, the duration of each data collection gap in N gaps may be the same or different. For example, each of the N gaps is 5 minutes, and further, traffic flow data in each data collection gap includes recording start time (Time), traffic flow (Flow) in this gap and crowd (Crowd) or non-crowd.

Further, the recording start time (Time) is of a data type Datetime. For example, if each gap is 5 minutes, 2016 records (12 records per hour, a total of 12*24*7 records collected in a week) can be collected in a week (7 days), and the recording start time (Time) is denoted as an integer value from 1 to 2016, where "1" represents 0:00-0:05 Monday, "2" represents 0:06-0:10 Monday, . . . . By analogy, the crowd (Crowd) or non-crowd can be determined via the device such as the camera by collecting statistics of traffic flow. For example, if traffic flow in the predetermined gap is greater than a predetermined value, the crowd is determined; otherwise, the non-crowd is determined. The crowd (Crowd) or non-crowd can be Bool data (that is, 1 represents yes and 0 represents no).

S2. Divide the historical dataset P into a sample PA including M pieces of crowd data {($Time_1$, $Flow_1$, $Crowd_1$), ($Time_2$, $Flow_2$, $Crowd_2$), . . . , ($Time_M$, $Flow_M$, $Crowd_M$)} and a sample PB including (N−M) pieces of non-crowd data {($Time_1$, $Flow_1$, $Crowd_1$), ($Time_2$, $Flow_2$, $Crowd_2$), . . . , ($Time_{N-M}$, $Flow_{N-M}$, $Crowd_{N-M}$)} according to the crowd or non-crowd.

In addition, a crowding level (Level) is assigned to each piece of traffic flow data in the sample PA and the sample PB.

Specifically, assigning a crowding level (Level) to each piece of traffic flow data in the sample PA includes the following steps:

obtaining average vehicle delay time $\overline{d_i}$ in each piece of traffic flow data within unit time in the sample PA according to equation (1):

$$\overline{d_i} = \frac{Flow_i}{L} \quad (1)$$

where L is the unit time (for example, 5 minutes) and a value range of i is [1, M];

assigning a crowding level (Level) to the corresponding traffic flow data according to the average vehicle delay time $\overline{d_i}$ includes:

if the first threshold≤$\overline{d_i}$ the second threshold, assigning a crowding level (Level) of "slow traffic" to the corresponding traffic flow data;

if the second threshold≤$\overline{d_i}$ the third threshold, assigning a crowding level (Level) of "crowded" to the corresponding traffic flow data;

and if the third threshold≤$\overline{d_i}$ assigning a crowding level (Level) of "severely crowded" to the corresponding traffic flow data.

In this embodiment, the first threshold<the second threshold<the third threshold. For example, the first threshold is 0.8, the second threshold is 1.5, and the third threshold is 2.1, which can be determined according to historical traffic flow data of a corresponding road section.

In addition, a crowding level (Level) of "smooth" is assigned to each piece of traffic flow data in the sample PB.

S3. Obtain the duration of a green light of each piece of traffic flow data in the sample PA and the sample PB separately.

Specifically, step S3 includes the following steps:

S31. Obtain the optimal number $A_{kpoint}$ of clusters of the sample PA and the optimal number $B_{kpoint}$ of clusters of the sample PB separately via the K-means algorithm.

S32. Obtain a cluster set $C_{A_1}, C_{A_2}, \ldots, C_{A_{kpoint}}$ of the sample PA and a cluster set $C_{B_1}, C_{B_2}, \ldots, C_{B_{kpoint}}$ of the sample PB separately via the K-means algorithm.

S33. Obtain an average traffic flow (Flow) value corresponding to each cluster in the cluster set $C_{A_1}, C_{A_2}, \ldots, C_{A_{kpoint}}$ according to the equation (2-1) and sort the average traffic flow (Flow) values; obtain an average traffic flow value corresponding to each cluster in the cluster set $C_{B_1}, C_{B_2}, \ldots, C_{B_{kpoint}}$ according to equation (2-2) and sort the average traffic flow values, where the higher the average traffic flow, the higher the traffic flow in the cluster.

$$(AVG(C_{A1}), AVG(C_{A2}), \ldots, AVG(C_{A_{kpoint}})) = \left(\frac{\sum_{i=1}^{n_1} p_i}{n_1}, \frac{\sum_{i=1}^{n_2} p_i}{n_2}, \ldots, \frac{\sum_{i=1}^{n_{kpoint}} p_i}{n_{kpoint}}\right); \text{ and} \quad (2\text{-}1)$$

$$(AVG(C_{B1}), AVG(C_{B2}), \ldots, AVG(C_{B_{kpoint}})) = \left(\frac{\sum_{i=1}^{n_1} p_i}{n_1}, \frac{\sum_{i=1}^{n_2} p_i}{n_2}, \ldots, \frac{\sum_{i=1}^{n_{kpoint}} p_i}{n_{kpoint}}\right) \quad (2\text{-}2)$$

where $p_i$ is a traffic flow (Flow) value in the $i^{th}$ piece of traffic flow data in a corresponding cluster (that is, a specific cluster $C_{A_1}, C_{A_2}, \ldots, C_{A_{kpoint}}$, or a specific cluster in $C_{B_1}, C_{B_2}, \ldots, C_{B_{kpoint}}$) and n is the total number of traffic flow data in the corresponding cluster;

S34. Assign different durations of the green light for the traffic flow according to a sorting result of the average traffic flow values, including the following steps:

during a working day, assigning different durations (Dr) of a green light denoted as equation (3-1) for traffic flow corresponding to each cluster in the cluster set $C_{A_1}, C_{A_2}, \ldots, C_{A_{kpoint}}$ according to a sorting result of the average traffic flow values, and assigning different durations (Dr) of a green light denoted as equation (3-2) for an average traffic flow value corresponding to each cluster in the cluster set $C_{B_1}, C_{B_2}, \ldots, C_{B_{kpoint}}$ according to a sorting result of the average traffic flow values;

$$Drc_{A_1} = t1, Drc_{A_2} = t1 + t2*2, \ldots, Drc_{A_i} = t1 + t2*(i-1), \ldots, Drc_{A_{kpoint}} = t1 + t2*(A_{kpoint}-1); \text{ and} \quad (3\text{-}1)$$

$$Drc_{B_1} = t3, Drc_{B_2} = t3 + t4*2, \ldots, Drc_{B_i} = t3 + t4*(i-1), \ldots, Drc_{B_{kpoint}} = t3 + t4*(B_{kpoint}-1) \quad (3\text{-}2)$$

where $Dr_{C_{A_i}}$ represents the duration of the green light with respect to the traffic flow corresponding to the cluster i in the cluster set $C_{A_1}, C_{A_2}, \ldots, C_{A_{kpoint}}$, $Dr_{C_{B_i}}$ represents the duration of the green light with respect to the traffic flow corresponding to the cluster i in $C_{B_1}, C_{B_2}, \ldots, C_{B_{kpoint}}$, t1>t3, t2≥t4, all units are seconds or minutes, and the value ranges of i are [1, $A_{kpoint}$] and [1, $B_{kpoint}$].

For example, in this embodiment, t1 is 30 s, t2 is 15 s, t3 is 20 s, and t4 is 10 s, which can be flexibly adjusted according to the historical traffic flow data of the corresponding road section.

During a holiday, assigning different durations of a green light denoted as equation (3-3) for traffic flow corresponding to each cluster in the cluster set $C_{A_1}, C_{A_2}, \ldots, C_{A_{kpoint}}$ according to a sorting result of the average traffic flow values, and assigning different durations of a green light denoted as equation (3-4) for an average traffic flow value corresponding to each cluster in the cluster set $C_{B_1}, C_{B_2}, \ldots, C_{B_{kpoint}}$ according to a sorting result of the average traffic flow values;

$$Dr_{C_{A_1}} = t5, Dr_{C_{A_2}} = t5 + t6 * 2, \ldots, Dr_{C_{A_i}} = t5 + t6 * (i-1), \ldots, Dr_{C_{A_{kpoint}}} = t5 + t6 * (A_{kpoint} - 1) \quad (3\text{-}3)$$

$$Dr_{C_{B_1}} = t7, Dr_{C_{B_2}} = t7 + t8 * 2, \ldots, Dr_{C_{B_i}} = t7 + t8 * (i-1), \ldots, Dr_{C_{B_{kpoint}}} = t7 + t8 * (B_{kpoint} - 1) \quad (3\text{-}4)$$

where $Dr_{C_{A_i}}$ represents the duration of the green light with respect to the traffic flow corresponding to a cluster i in the cluster set $C_{A_1}, C_{A_2}, \ldots, C_{A_{kpoint}}$, $Dr_{C_{B_i}}$ represents the duration of the green light with respect to the traffic flow corresponding to a cluster i in $C_{B_1}, C_{B_2}, \ldots, C_{B_{kpoint}}$ t5>t7≥t1>t3, t6≥t8≥t2≥t4, all units are seconds or minutes, and the value ranges of i are [1, $A_{kpoint}$] and [1, $B_{kpoint}$].

For example, in this embodiment, t5 is 50 s, t6 is 15 s, t7 is 30 s, and t8 is 15 s, which can be flexibly adjusted according to the historical traffic flow data of the corresponding road section during a holiday.

S35. Add the crowding level (Level) and the duration (Dr) of the green light to the historical dataset, to update the historical dataset P to:

$$P\{(\text{Time}_1, \text{Flow}_1, \text{Crowd}_1, \text{Level}_1, Dr_1), (\text{Time}_2, \text{Flow}_2, \text{Crowd}_2, \text{Level}_2, Dr_2), \ldots, P\{(\text{Time}_N, \text{Flow}_N, \text{Crowd}_N, \text{Level}_N, Dr_N)\}\}$$

In the foregoing step, because traffic flow is greater on holidays than on working days, the duration of the green light on holidays is generally greater than that on working days. In addition, because the sample PA includes crowd data, the duration of the green light also needs to be prolonged for the sample PA, compared with the sample PB. Therefore, prolonging the duration of the green light (that is, prolonging the duration of the green light for the sample PA) can keep the traffic flow smooth during holidays and reduce crowding possibility, so that an actual traffic flow control requirement is better met, to achieve an optimal control effect.

S4. Generate a preliminary classification model $A_i$ according to the duration of the green light. Specifically, step S4 includes:

S41. Use the traffic flow (Flow), the crowd (Crowd) or non-crowd and the crowding level (Level) in the updated historical dataset P as training characteristics.

S42. Calculate Gini values of each training characteristic under different division standards separately according to equation (4), and select the minimum Gini values and a corresponding division standard, to obtain the minimum Gini values a1, a2 and a3 corresponding to the traffic flow (Flow), the crowd (Crowd) or non-crowd and the crowding level (Level) in the gap separately;

$$Gini_A(D) = \mathrm{MIN}\left(\frac{|D_i|}{|D|}Gini(D_i) + \frac{|D_{m-i}|}{|D|}Gini(D_{m-i})\right), \quad i = m_n,\ n = 1 \ldots, |m| \quad (4)$$

where m is a category set of a specific training characteristic A, |m| is the number of elements in the set, $m_n$ is the $n^{th}$ element in the set, $|D_i|$ is the number of a specific category i with the training characteristic A, $|D_{m-i}|$ is the total number of categories other than the category i with the training characteristic A, and |D| is the total number of categories with the training characteristic A.

For example, if discrete crowding levels (Level) are selected as the training characteristics A, the number of categories is 4, namely, "smooth", "slow traffic", "crowded", and "severely crowded", and the numbers of categories are 10, 30, 40 and 20 separately, A=Level, m={smooth, slow traffic, crowded, and severely crowded}, |m|=4, and |D|=100. Further, assuming that n=1, i={smooth}, and m−i={slow traffic ∪ crowded ∪ severely crowded}, a classification standard can be split1={smooth, slow traffic ∪ crowded ∪ severely crowded}($|D_i|$=10 and $|D_{m-i}|$=901). Similarly, split2={slow traffic, smooth ∪ crowded ∪ severely crowded} ($|D_i|$=30 and $|D_{m-i}|$=701), split3={crowded, smooth ∪ slow traffic ∪ severely crowded} ($|D_i|$=40 and $|D_{m-i}|$=601), and split4={severely crowded, smooth ∪ slow traffic U crowded} ($|D_i|$=20 and $|D_{m-i}|$=801). A Gini value under each classification standard is calculated. Assuming that the Gini values under the four classification standards are $Gini_{split1}$=0.3, $Gini_{split2}$=0.4, $Gini_{split3}$=0.45 and $Gini_{split4}$=0.36, the minimum Gini value of the crowding levels (Level) is $Gini_{split1}$=0.3, which is denoted as a1.

For another example, if continuous traffic flow (Flow) is selected as the training characteristic A, there are a total of 10 pieces of traffic flow data, values are a set B={80, 80, 60, 120, 60, 80, 60, 120, 80, 80}, and the amount of traffic flow included in value ranges [0, 70], [71, 100] and [101, +∞] are 3, 5, and 2 separately, and there are 3 unique values after a duplicate value is eliminated from the set B and the set B is sorted, namely, {60, 80, 120} separately. The median values of each two of the values are {70, 100}, that is, 70=(60+80)/2 and 100=(80+120)/2. A=Flow, m={70, 100}, |m|=2, and (|D|=10. Further, assuming that n=1, i={70}, and m−i={100}, classification standards can be split1={<70, >70} ($|D_i|$=3 and $|D_{m-i}|$=7), split2={≤100, >100} ($|D_i|$=8 and $|D_{m-i}|$=2), and a Gini value under each classification standard is calculated. Assuming that $Gini_{split1}$=0.28 and $Gini_{split2}$=0.44, the minimum Gini value of the traffic flow (Flow) is $Gini_{split1}$=0.28, which is denoted as a2.

By analogy, in order to obtain the minimum Gini value of another training characteristic, it should be noted that a classification standard of each training characteristic can be a separate classification based on the characteristic.

S43. Compare the minimum Gini values a1, a2 and a3 corresponding to the traffic flow (Flow), the crowd (Crowd) or non-crowd and the crowding level (Level) separately in the gap to determine the global minimum Gini value min (that is, the minimum value in a1, a2 and a3).

S44. Determine the division standard corresponding to the global minimum Gini value min as a branch node of a current decision tree.

S45. Repeat the foregoing steps S42 to S44 to construct a multicategory decision tree shown in FIG. 2, where the multicategory decision tree is intended to obtain the preliminary classification model $A_i$.

Figure 2:
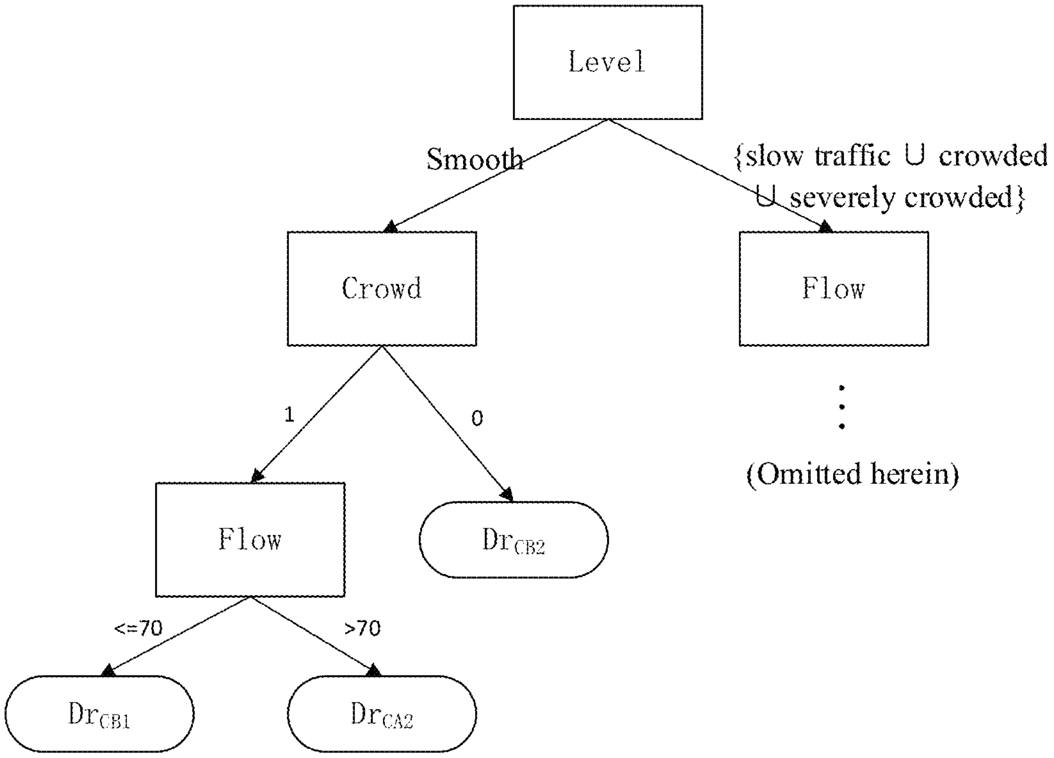
FIG. 2 is a schematic diagram of a preliminary classification model $A_i$ according to an embodiment of the present invention.

Further, in FIG. 2, nodes of a square box represent training characteristics (namely, the traffic flow (Flow), the crowd (Crowd) or non-crowd and the crowding level (Level)), branches represent categories of the training characteristics (for example, "smooth" and "slow traffic" are categories of the crowding level (Level), 0 and 1 are categories of the crowd (Crowd) or non-crowd, and ≤70 and >70 are categories of the traffic flow (Flow)), and nodes of an elliptical box represent predicted duration results (namely, $Dr_{CB2}$ and $Dr_{CA2}$) of the green light corresponding to different categories.

S5. Obtain traffic flow data at the current moment, predict the duration of a green light for traffic flow according to the preliminary classification model $A_i$ or an optimized classification model $A_{i+1}$ of the preliminary classification model $A_i$, and predict the duration of a red light in traffic lights to which the green light belongs according to the predicted duration of the green light. In this embodiment, the predicted duration of the red light=the predicted duration of the green light+$t_g$, where the unit of $t_g$ is seconds, for example, 10 s to 20 s.

For example, as shown in FIG. 2, if level="smooth", crowd=1, and flow=80 in the traffic flow data obtained at the current moment, the predicted duration of the green light is $Dr_{CA2}$. Further, a predicted duration value of the red light disposed on the same traffic lights as the green light is the sum of $$Dr_{C_{A_2}}$$

and $t_g$, where $t_g$ is set to 20 s.

S6. Control timing of the green light and the red light on the same traffic lights according to the predicted duration of the green light and the red light.

In the prior art, a model for which training has been completed is usually used to adjust the traffic light timing solution. However, the timing of the traffic lights is only set to a fixed value, but the fixed value cannot be adjusted correspondingly based on a crowding condition in the current or historical traffic flow data. Therefore, if the current crowding level is not severe, the fixed value causes a waste of transportation time; if the current crowding is relatively severe (for example, during rush hours of National Day), the fixed value further aggravates the crowding.

However, in the present invention, a data sample of a historical crowding condition (namely, a historical dataset) is introduced. The duration of a green light can be dynamically adjusted at different periods (for example, working days and holidays) and under different crowding conditions (that is, the sample PA and the sample PB) with reference to historical crowding conditions, and on this basis, a prediction model is obtained to ensure that a timing result of the green light better matches an actual condition. For example, the duration of the green light is prolonged during crowding and holidays to optimize traffic control solutions and efficiency.

Embodiment 2

A difference between this embodiment and Embodiment 1 is that step S31 includes:

S311. Randomly select k pieces of traffic flow data from the sample PA or the sample PB, and use each piece of traffic flow data as a center point of the cluster, to form k initial clusters, where k=1 in this embodiment.

S312. Calculate the distance between each piece of traffic flow data in other traffic flow data and an average of each initial cluster separately, and sort current traffic flow data into the closest initial cluster, to obtain k update clusters with cluster changes.

S313. Recalculate an average of each update cluster and use the average as a center point of the update cluster.

S314. Repeat S312 and S313 until the center point of each cluster is no longer redistributed, thereby completing clustering.

S315. Obtain a clustering result for the current number k of clusters according to equation (5):

$$SSE_k = \sum_{i=1}^{k} \sum_{p \varepsilon C_i} |p - m_i|^2 \tag{5}$$

where k is the current number of clusters, $SSE_k$ is the sum of squares of error when the current number of clusters is k, $C_i$ is the $i^{th}$ cluster after clustering is completed when the current number of clusters is k, p is a value of all samples of a cluster $C_i$, and mi is an average of the current cluster $C_i$.

S316. Add 1 to the current number k of clusters, and repeat S311 to S315 until k=11;

S317. Obtain the optimal number $A_{kpoint}$ of clusters of the sample PA or the optimal number $B_{kpoint}$ of clusters of the sample PB according to equation (6), where, in other words, if clustering in S311 to S315 is performed for the sample PA, finally obtained kpoint is the optimal number $A_{kpoint}$ of clusters of the sample PA; if clustering in S311 to S315 is performed for the sample PB, finally obtained kpoint is the optimal number $B_{kpoint}$ of clusters of the sample PB;

$$kpoint = i, \quad i = \mathrm{MAX}\left(\frac{SSE_i - SSE_{i-1}}{SSE_{i+1} - SSE_i}\right) \tag{6}$$

where i is the number k of clusters obtained cyclically in steps S311 to S316, the value range is [2,10), $SSE_{i+1}$ is the sum of squares of error when the number of clusters is i−1, $SSE_{i+1}$ is the sum of squares of error when the number of clusters is i+1, and $SSE_i$ is the sum of squares of error when the number of clusters is i.

With the help of the Elbow method, a knee point kpoint (namely, the number of clusters) is found, that is, an SSE value suddenly decreases. However, as the number i of clusters increases, the decreasing rate of the value tends to be gentle. In the Elbow method, the knee point is mainly looked for through image observation, but the method is neither autonomous nor sufficiently accurate. Therefore, in consideration of front and back decreasing trends with different numbers of clusters, decreasing proportions with numbers i of different clusters are calculated according to equation (6), and the largest proportion is selected.

In this case, the optimal numbers kpoint of clusters of the samples PA and PB are correspondingly obtained, and are denoted as $A_{kpoint}$ and $B_{kpoint}$.

Embodiment 3

The only difference between this embodiment and Embodiment 1 or 2 is that the duration prediction of the green light is completed based on the traffic flow data collected in the fixed gap (Gap) in the preliminary classification model $A_i$ in step S5, and the preliminary classification model $A_i$ cannot sufficiently match an actual road condition at a specific moment. For example, if a road section is in a crowded condition with great traffic flow, traffic flow data needs to be collected more frequently and duration adjustment of the green light needs to be completed more quickly, to alleviate traffic pressure on the road. However, in the case of smooth traffic, the duration adjustment time of the green light can be prolonged, and there is no need to adjust the green light timing solution frequently.

Therefore, the preliminary classification model $A_i$ needs to be optimized, to obtain the optimized classification model $A_{i+1}$, which includes the following steps:

obtaining traffic flow data P (Time, Flow, Crowd and Level) at the current moment t; completing the prediction of the duration of the green light corresponding to the traffic flow data according to the preliminary classification model $A_i$, and if there is a crowd at the next moment t+1, adding the traffic flow data P (Time, Flow, Crowd and Level) obtained at the current moment t to a traffic flow data sample corresponding to the preliminary classification model $A_i$, and increasing the duration of the green light corresponding to the traffic flow data obtained at the next moment t+1, where, for example, if the predicted duration of the green light at the moment t is $$Drc_{A_2},$$

the crowding occurs at the moment t+1, the duration of the green light of the obtained traffic flow data at the moment t+1 is increased, so that the duration of the green light is $$Drc_{A_3};$$

shortening a collection gap (Gap) of the traffic flow data according to equation (7-1) simultaneously, to make an adjustment for a crowding condition more efficiently;

$$Gap_{next} = Gap_{pre} - t9,\ Gap \in [t10, t11] \tag{7-1}$$

where $Gap_{pre}$ is the duration of a data collection gap at the current moment t, $Gap_{next}$ is the duration of the data collection gap at the next moment t+1, t11≥t10, and all units are seconds or minutes, where, for example, in this embodiment, t9 is 10 s, t10 is 10 s, and t11 is 300 s;

if there is no crowd at the next moment t+1, selecting a cluster $C_{A_1}, C_{A_2}, \ldots, C_{A_{kpoint}}$, or $C_{B_1}, C_{B_2}, \ldots, C_{B_{kpoint}}$, correspondingly according to the "crowding level (Level)" in the traffic flow data P (Time, Flow, Crowd and Level) at the current moment t, obtaining similarity between the traffic flow data P (Time, Flow, Crowd and Level) at the current moment t and each cluster in the cluster $C_{A_1}, C_{A_2}, \ldots, C_{A_{kpoint}}$ or $C_{B_1}, C_{B_2}, \ldots, C_{B_{kpoint}}$ according to equation (7-2), adding the traffic flow data P (Time, Flow, Crowd and Level) at the current moment t to the most similar cluster, and assigning duration of the green light to the traffic flow corresponding to the most similar cluster;

$$C_P = \mathrm{Min}(\mathrm{Distance}(\mathrm{Center}_{C_i} - A)),\ i \in [1, kpoint] \tag{7-2}$$

where $C_P$ is a cluster closest to the traffic flow data P (Time, Flow, Crowd and Level) at the current moment t, $\mathrm{Center}_{Ci}$ is an average of all traffic flow (Flow) in the $i^{th}$ cluster, A is the traffic flow data P (Time, Flow, Crowd and Level) at the current moment t, the distance is Euclidean distance, and kpoint is $A_{kpoint}$ or $B_{kpoint}$; for example, if the crowding level (Level) in the traffic flow data P (Time, Flow, Crowd and Level) at the current moment t is "smooth", the cluster $C_{B_1}, C_{B_2}, \ldots, C_{B_{kpoint}}$, corresponding to the sample PB is selected, and similarity between the traffic flow data P (Time, Flow, Crowd and Level) and $C_{B_1}, C_{B_2}, \ldots, C_{B_{kpoint}}$ is calculated separately according to equation (7-2); if the cluster $C_{B_2}$ is most similar (closest) after calculation, the traffic flow data P (Time, Flow, Crowd and Level) is added to the cluster $C_{B_2}$, the duration of the green light of the cluster $C_{B_2}$ is $$Drc_{B_2},$$

and therefore, duration $$Dr_{C_{B_2}}$$

of the green light is assigned to the traffic flow data P;

prolonging the collection gap (Gap) of the traffic flow data according to equation (7-3);

$$Gap_{next} = Gap_{pre} + t9,\ Gap\epsilon[t10, t11] \quad (7\text{-}3)$$

where $Gap_{pre}$ is the duration of a data collection gap at the current moment t, $Gap_{next}$ is the duration of the data collection gap at the next moment t+1, t11≥t10, and all units are seconds or minutes, where, for example, in this embodiment, t9 is 10 s, t10 is 10 s, and t11 is 300 s;

and repeating steps S1 to S4 according to $Gap_{next}$ to obtain the optimized classification model $A_{i+1}$.

Embodiment 4

Figure 3:
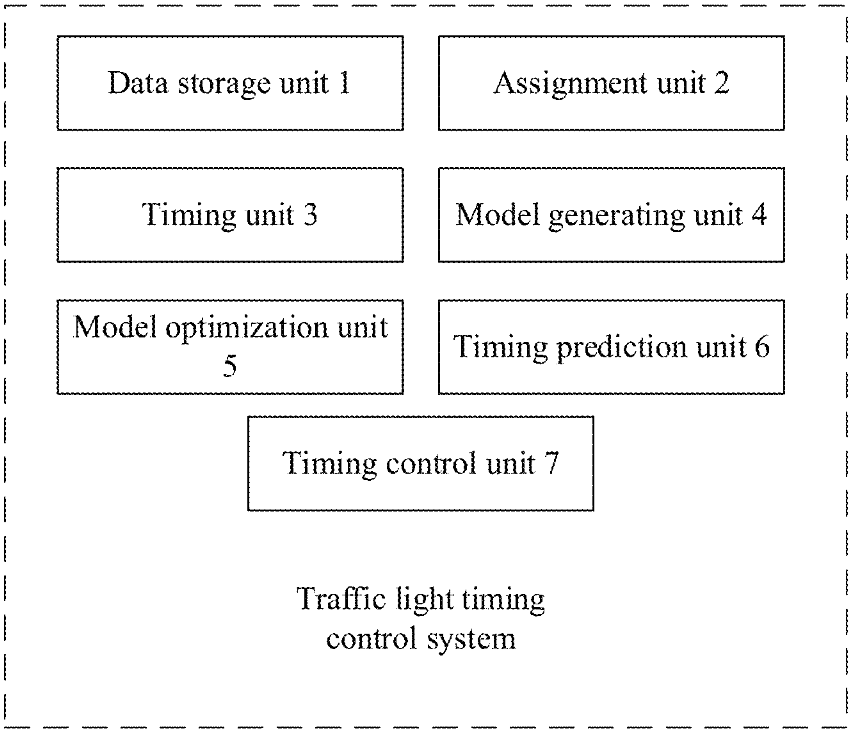
FIG. 3 is a schematic structural diagram of a traffic light timing control method and system according to an embodiment of the present invention.

This embodiment provides a traffic light timing control system for implementing the traffic light timing control method described in Embodiment 1 or 2. Specifically, as shown in FIG. 3, the traffic light timing control system includes:

a data storage unit 1, configured to record and store traffic flow data of a specific road section in each of N data collection gaps;

an assignment unit 2, configured to assign a crowding level to each piece of traffic flow data in a sample PA including M pieces of crowd data and a sample PB including (N–M) pieces of non-crowd data, where a step is the same as S2;

a timing unit 3, configured to obtain the duration of a green light of each piece of traffic flow data in the sample PA and the sample PB separately, where the step is the same as S3;

a model generating unit 4, configured to generate a preliminary classification model $A_i$ according to the duration of the green light, where the step is the same as S4;

a model optimization unit 5, configured to optimize the preliminary classification model $A_i$, to obtain the optimized classification model $A_{i+1}$, where the step is the same as that in Embodiment 3;

a timing prediction unit 6, configured to predict the duration of a green light for traffic flow according to traffic flow data at the current moment and the preliminary classification model $A_i$ or an optimized classification model $A_{i+1}$ of the preliminary classification model $A_i$;

and a timing control unit 7, configured to control the timing of the green light in the traffic lights according to the predicted duration of the green light.

In conclusion, in the present invention, the duration of a green light can be dynamically adjusted at different periods (for example, working days and holidays) and under different crowding conditions (that is, the sample PA and the sample PB) with reference to historical crowding conditions, and on this basis, a prediction model is obtained to ensure that a timing result of the green light better matches an actual condition; the duration of a data collection gap is also adjusted for an actual road condition, and a duration adjustment pace of the green light is further optimized, so that a green light timing control solution obtained finally can better meet an actual traffic control requirement.

Obviously, technicians in the field can make various modifications and variations to the present invention without departing from the spirit and scope of the present invention. Therefore, the present invention is also intended to cover these modifications and variations provided that they fall within the scope of the claims of the present invention and their equivalent technologies.

What is claimed is:

1. A traffic light timing control method, comprising the following steps:

S1: completing monitoring of traffic flow in a specific road section, and recording and storing traffic flow data in each of N data collection gaps, to obtain a historical dataset comprising N traffic flow data samples, wherein traffic flow data in each data collection gap comprises: recording start time, traffic flow in this gap and crowd or non-crowd;

S2: dividing the historical dataset into a sample PA comprising M pieces of crowd data and a sample PB comprising (N–M) pieces of non-crowd data according to the crowd or non-crowd, and assigning a crowding level to each piece of traffic flow data in the sample PA and the sample PB;

S3: obtaining the duration of a green light of each piece of traffic flow data in the sample PA and the sample PB separately;

S4: generating a preliminary classification model $A_i$ according to the duration of the green light;

S5: obtaining traffic flow data at the current moment, predicting the duration of a green light for traffic flow according to the preliminary classification model $A_i$ or an optimized classification model $A_{i+1}$ of the preliminary classification model $A_i$, and predicting the duration of a red light in traffic lights to which the green light belongs according to the predicted duration of the green light;

and S6: controlling timing of the green light and the red light on the same traffic lights according to the predicted duration of the green light and the red light;

wherein step S3 comprises:

S31: obtaining the optimal number $A_{kpoint}$ of clusters of the sample PA and the optimal number $B_{kpoint}$ of clusters of the sample PB separately;

S32: obtaining a cluster set $C_{A_1}, C_{A_2}, \ldots, C_{A_{kpoint}}$ of the sample PA and a cluster set $C_{B_1}, C_{B_2}, \ldots, C_{B_{kpoint}}$ of the sample PB separately;

S33: obtaining an average traffic flow value corresponding to each cluster in the cluster set $C_{A_1}, C_{A_2}, \ldots, C_{A_{kpoint}}$ according to the equation (2-1), sorting the average traffic flow values, and obtaining an average traffic flow value corresponding to each cluster in the cluster set $C_{B_1}, C_{B_2}, \ldots, C_{B_{kpoint}}$ according to equation (2-2), sorting the average traffic flow values;

$$(AVG(C_{A_1}), AVG(C_{A_2}), \ldots, AVG(C_{A_{kpoint}})) = \left(\frac{\sum_{i=1}^{n_1} p_i}{n_1}, \frac{\sum_{i=1}^{n_2} p_i}{n_2}, \ldots, \frac{\sum_{i=1}^{n_{kpoint}} p_i}{n_{kpoint}}\right); \text{ and} \tag{2-1}$$

$$(AVG(C_{B_1}), AVG(C_{B_2}), \ldots, AVG(C_{B_{kpoint}})) = \left(\frac{\sum_{i=1}^{n_1} p_i}{n_1}, \frac{\sum_{i=1}^{n_2} p_i}{n_2}, \ldots, \frac{\sum_{i=1}^{n_{kpoint}} p_i}{n_{kpoint}}\right) \tag{2-2}$$

wherein $p_i$ is a traffic flow value in an $i^{th}$ piece of traffic flow data in a corresponding cluster, and n is the total number of traffic flow data in the corresponding cluster;

S34: assigning different durations of the green light for the traffic flow according to a sorting result of the average traffic flow values;

and S35: adding the crowding level and the duration of the green light to the historical dataset, to complete of updating of the historical dataset;

wherein step S4 comprises:

S41: using the traffic flow, the crowd or non-crowd and the crowding level in the updated historical dataset as training characteristics;

S42: calculating Gini values of each training characteristic under different division standards separately according to equation (4), and selecting the minimum Gini values and a corresponding division standard, to obtain the minimum Gini values a1, a2 and a3 corresponding to the traffic flow, the crowd or non-crowd, and the crowding level in the gap separately;

$$\text{Gini}_A(D) = \text{MIN}\left(\frac{|D_i|}{|D|}\text{Gini}(D_i) + \frac{|D_{m-i}|}{|D.|}\text{Gini}(D_{m-i})\right), \quad i = m_n, \quad n = 1, 2, \ldots, |m| \tag{4}$$

wherein m is a category set of a specific raining characteristic A, |m| is the number of elements in the set, $m_n$ is the $n^{th}$ element in the set, $|D_i|$ is the number of a specific category i with the training characteristic A, $|D_{m-i}|$ is the total number of categories other than the category i with the training characteristic A, and |D| is the total number of categories with the training characteristic A;

S43: comparing the minimum Gini values a1, a2 and a3 corresponding to the traffic flow, the crowd or non-crowd and the crowding level separately in the gap to determine the global minimum Gini value min;

S44: determining the division standard corresponding to the global minimum Gini value min as a branch node of a current decision tree;

and S45: repeating the foregoing steps S42 to S44 to construct a multicategory decision tree, wherein the multicategory decision tree is intended to obtain the preliminary classification model $A_i$.

2. The traffic light timing control method according to claim 1, wherein in step S2, assigning a crowding level to each piece of traffic flow data in the sample PA comprises the following steps:

obtaining average vehicle delay time $\overline{d_i}$ in each piece of traffic flow data within unit time in the sample PA according to equation (1):

$$\overline{d_i} = \frac{\text{Flow}_i}{L} \tag{1}$$

wherein L is the unit time and a value range of i is [1, M];

and assigning a crowding level to the corresponding traffic flow data according to the average vehicle delay time $\overline{d_i}$.

3. The traffic light timing control method according to claim 2, wherein assigning a crowding level to the corresponding traffic flow data according to the average vehicle delay time $\overline{d_i}$ comprises:

if the first threshold≤$\overline{d_i}$< the second threshold, assigning a crowding level of "slow traffic" to the corresponding traffic flow data;

if the second threshold≤$\overline{d_i}$< the third threshold, assigning a crowding level of "crowded" to the corresponding traffic flow data;

if the third threshold≤$\overline{d_i}$, assigning a crowding level of "severely crowded" to the corresponding traffic flow data;

and the first threshold< the second threshold< the third threshold.

4. The traffic light timing control method according to claim 1, wherein in step S2, a crowding level of "smooth" is assigned to each piece of traffic flow data in the sample PB.

5. The traffic light timing control method according to claim 1, wherein step S34 comprises: during a working day, assigning different durations of a green light denoted as equation (3-1) for traffic flow corresponding to each cluster in the cluster set $C_{A_1}$, $C_{A_2}$, . . . , $C_{A_{point}}$ according to a sorting result of the average traffic flow values, and assigning different durations of a green light denoted as equation (3-2) for an average traffic flow value corresponding to each cluster in the cluster set $C_{B_1}$, $C_{B_2}$, . . . , $C_{B_{kpoint}}$ according to a sorting result of the average traffic flow values;

$$Drc_{A_1} = t1, Drc_{A_2} = t1 + t2*2, \ldots, Drc_{A_i} = t1 + t2*(i-1), \ldots, Drc_{A_{kpoint}} = t1 + t2*(A_{kpoint}-1); \text{ and} \tag{3-1}$$

$$Drc_{B_1} = t3, Drc_{B_2} = t3 + t4*2, \ldots, Drc_{B_i} = t3 + t4*(i-1), \ldots, Drc_{B_{kpoint}} = t3 + t4*(B_{kpoint}-1) \tag{3-2}$$

wherein $$Drc_{A_i}$$

represents the duration of the green light with respect to the traffic flow corresponding to a cluster i in the cluster set $C_{A_1}$, $C_{A_2}$, . . . , $C_{A_{kpoint}}$, $$Drc_{B_i}$$

represents the duration of the green light with respect to the traffic flow corresponding to a cluster i in $C_{B_1}$, $C_{B_2}$, . . . , $C_{B_{kpoint}}$, t1>t3, t2≥t4, all units are seconds or minutes, and value ranges of i are [1, $A_{kpoint}$] and [1, $B_{kpoint}$].

6. The traffic light timing control method according to claim 5, wherein step S34 comprises: during a holiday, assigning different durations of a green light denoted as equation (3-3) for traffic flow corresponding to each cluster in the cluster set $C_{A_1}$, $C_{A_2}$, . . . , $C_{A_{kpoint}}$, according to a sorting result of the average traffic flow values, and assigning different durations of a green light denoted as equation (3-4) for an average traffic flow value corresponding to each cluster in the cluster set $C_{B_1}$, $C_{B_2}$, . . . , $C_{B_{kpoint}}$ according to a sorting result of the average traffic flow values;

$$Dr_{C_{A_1}}=t5,\ Dr_{C_{A_2}}=t5+t6*2,\ \dots,\ Dr_{C_{A_i}}=t5+t6*(i-1),\ \dots,\ Dr_{C_{A_{kpoint}}}=t5+t6*(A_{kpoint}-1);\ \text{and} \tag{3-3}$$

$$Dr_{C_{B_1}}=t7,\ Dr_{C_{B_2}}=t7+t8*2,\ \dots,\ Dr_{C_{B_i}}=t7+t8*(i-1),\ \dots,\ Dr_{C_{B_{kpoint}}}=t7+t8*(B_{kpoint}-1) \tag{3-4}$$

wherein $$Dr_{C_{A_i}}$$

represents the duration of the green light with respect to the traffic flow corresponding to a cluster i in the cluster set $C_{A_1}$, $C_{A_2}$, . . . , $C_{A_{kpoint}}$, $$Dr_{C_{B_i}}$$

represents the duration of the green light with respect to the traffic flow corresponding to a cluster i in $C_{B_1}$, $C_{B_2}$, . . . , $C_{B_{kpoint}}$, t5>t7≥t1>t3, t6≥t8≥t2≥t4, all units are seconds or minutes, and value ranges of i are [1, $A_{kpoint}$] and [1, $B_{kpoint}$].

7. The traffic light timing control method according to claim 1, wherein step S31 comprises:

S311: randomly selecting k pieces of traffic flow data from the sample PA or the sample PB, and using each piece of traffic flow data as a center point of the cluster, to form k initial clusters, wherein k=1;

S312: calculating the distance between each piece of traffic flow data in other traffic flow data and an average of each initial cluster separately, and sorting current traffic flow data into the closest initial cluster, to obtain k update clusters with cluster changes;

S313: recalculating an average of each update cluster and using the average as a center point of the update cluster;

S314: repeating S312 and S313 until the center point of each cluster is no longer redistributed, thereby completing clustering;

S315: obtaining a clustering result for the current number k of clusters according to equation (5):

$$SSE_k=\sum_{i=1}^{k}\sum_{p\in C_i}|p-m_i|^2 \tag{5}$$

wherein k is the current number of clusters, $SSE_k$ is the sum of squares of error when the current number of clusters is k, $C_i$ is the $i^{th}$ cluster after clustering is completed when the current number of clusters is k, p is a value of all samples of a cluster $C_i$, and mi is an average of the current cluster $C_i$;

S316: adding 1 to the current number k of clusters, and repeating S311 to S315 until k=11;

and S317: obtaining the optimal number $A_{kpoint}$ of clusters of the sample PA or the optimal number $B_{kpoint}$ of clusters of the sample PB according to equation (6);

$$kpoint=i,\quad i=\mathrm{MAX}\left(\frac{SSE_i-SSE_{i-1}}{SSE_{i+1}-SSE_i}\right) \tag{6}$$

wherein i is the number k of clusters obtained cyclically in steps S311 to S316, a value range is [2, 10), $SSE_{i-1}$ is the sum of squares of error when the number of clusters is i−1, $SSE_{i+1}$ is the sum of squares of error when the number of clusters is i+1, and $SSE_i$ is the sum of squares of error when the number of clusters is i.

8. The traffic light timing control method according to claim 1, wherein obtaining an optimized classification model $A_{i+1}$ comprises the following steps:

obtaining traffic flow data at the current moment t;

completing the prediction of the duration of the green light corresponding to the traffic flow data according to the preliminary classification model $A_i$, and if there is a crowd at the next moment t+1, adding the traffic flow data obtained at the current moment t to a traffic flow data sample corresponding to the preliminary classification model $A_i$, and increasing the duration of the green light corresponding to the traffic flow data obtained at the next moment t+1;

shortening the collection gap of the traffic flow data according to equation (7-1) simultaneously;

$$\mathrm{Gap}_{next}=\mathrm{Gap}_{pre}-t9,\ \mathrm{Gap}\in[t10,\ t11] \tag{7-1}$$

wherein $\mathrm{Gap}_{pre}$ is the duration of a data collection gap at the current moment t, $\mathrm{Gap}_{next}$ is the duration of the data collection gap at the next moment t+1, t11≥t10, and all units are seconds or minutes;

if there is no crowd at the next moment t+1, selecting a cluster $C_{A_1}$, $C_{A_2}$, . . . , $C_{A_{kpoint}}$ or $C_{B_1}$, $C_{B_2}$, . . . , $C_{B_{kpoint}}$ correspondingly according to the "crowding level" in the traffic flow data at the current moment t, obtaining similarity between the traffic flow data at the current moment t and each cluster in the cluster $C_{A_1}$, $C_{A_2}$, . . . , $C_{A_{kpoint}}$ or $C_{B_1}$, $C_{B_2}$, . . . , $C_{B_{kpoint}}$ according to equation (7-2), adding the traffic flow data at the current moment t to the most similar cluster, and assigning the duration of the green light to the traffic flow corresponding to the most similar cluster;

$$C_P=\mathrm{Min}(\mathrm{Distance}(\mathrm{Center}_{C_i}-A)),\ i\in[1,\ kpoint] \tag{7-2}$$

wherein $C_P$ is a cluster closest to the traffic flow data at the current moment t, $\mathrm{Center}_{Ci}$ is an average of all traffic flow in the $i^{th}$ cluster, A is the traffic flow data P at the current moment t, Distance is Euclidean distance, and kpoint is $A_{kpoint}$ or $B_{kpoint}$;

prolonging the collection gap of the traffic flow data according to equation (7-3);

$$Gap_{next} = Gap_{pre} + t9,\ Gap \in [t10, t11] \tag{7-3}$$

wherein $Gap_{pre}$ is the duration of a data collection gap at the current moment t, $Gap_{next}$ is the duration of the data collection gap at the next moment t+1, t11≥t10, and all units are seconds or minutes;

and repeating steps S1 to S4 according to $Gap_{next}$ to obtain the optimized classification model $A_{i+1}$.

9. A traffic light timing control system for implementing the traffic light timing control method according to claim 1, comprising: a data storage unit, configured to record and store traffic flow data of a specific road section in each of N data collection gaps;

an assignment unit, configured to assign a crowding level to each piece of traffic flow data in a sample PA comprising M pieces of crowd data and a sample PB comprising (N−M) pieces of non-crowd data;

a timing unit, configured to obtain the duration of a green light of each piece of traffic flow data in the sample PA and the sample PB separately;

a model generating unit, configured to generate a preliminary classification model $A_i$ according to the duration of the green light;

a model optimization unit, configured to optimize the preliminary classification model $A_i$, to obtain the optimized classification model $A_{i+1}$;

a timing prediction unit, configured to predict the duration of a green light for traffic flow according to traffic flow data at the current moment and the preliminary classification model $A_i$ or an optimized classification model $A_{i+1}$ of the preliminary classification model $A_i$;

and a timing control unit, configured to control the timing of the green light in the traffic lights according to the predicted duration of the green light.

* * * * *